Aug. 24, 1943.   W. LOTTER   2,327,807
BOOSTER BURNER
Filed Jan. 16, 1940   4 Sheets-Sheet 1
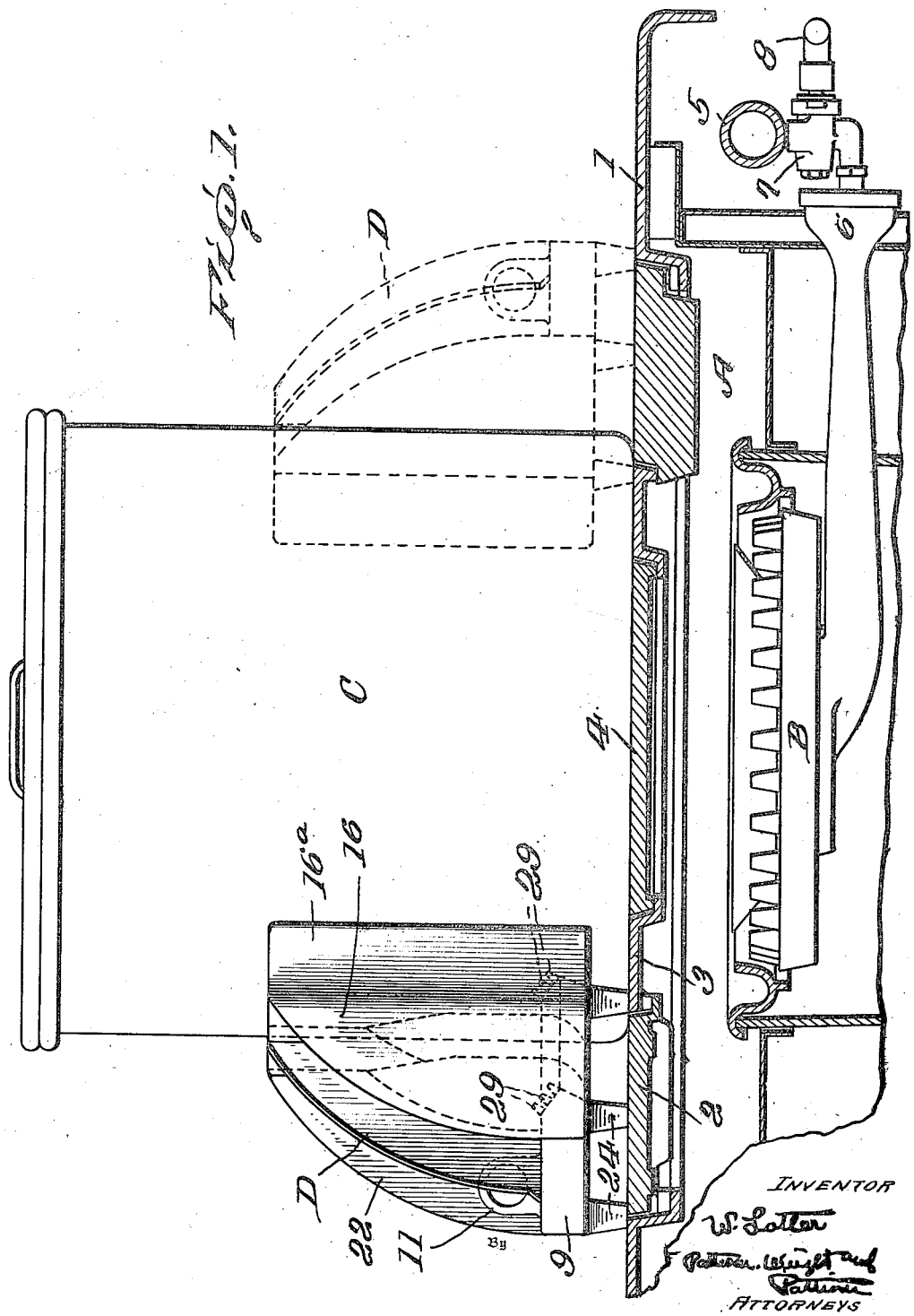

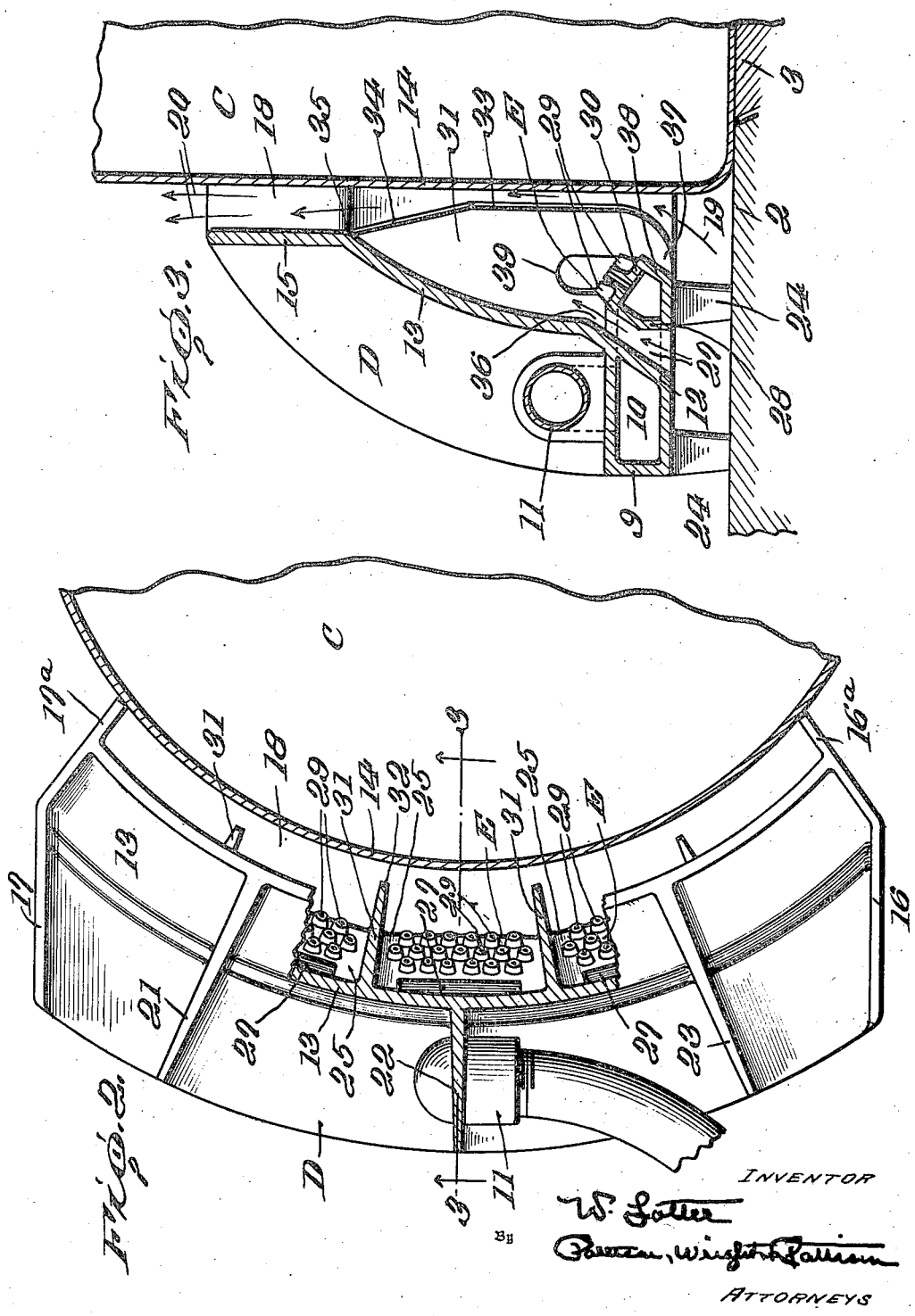

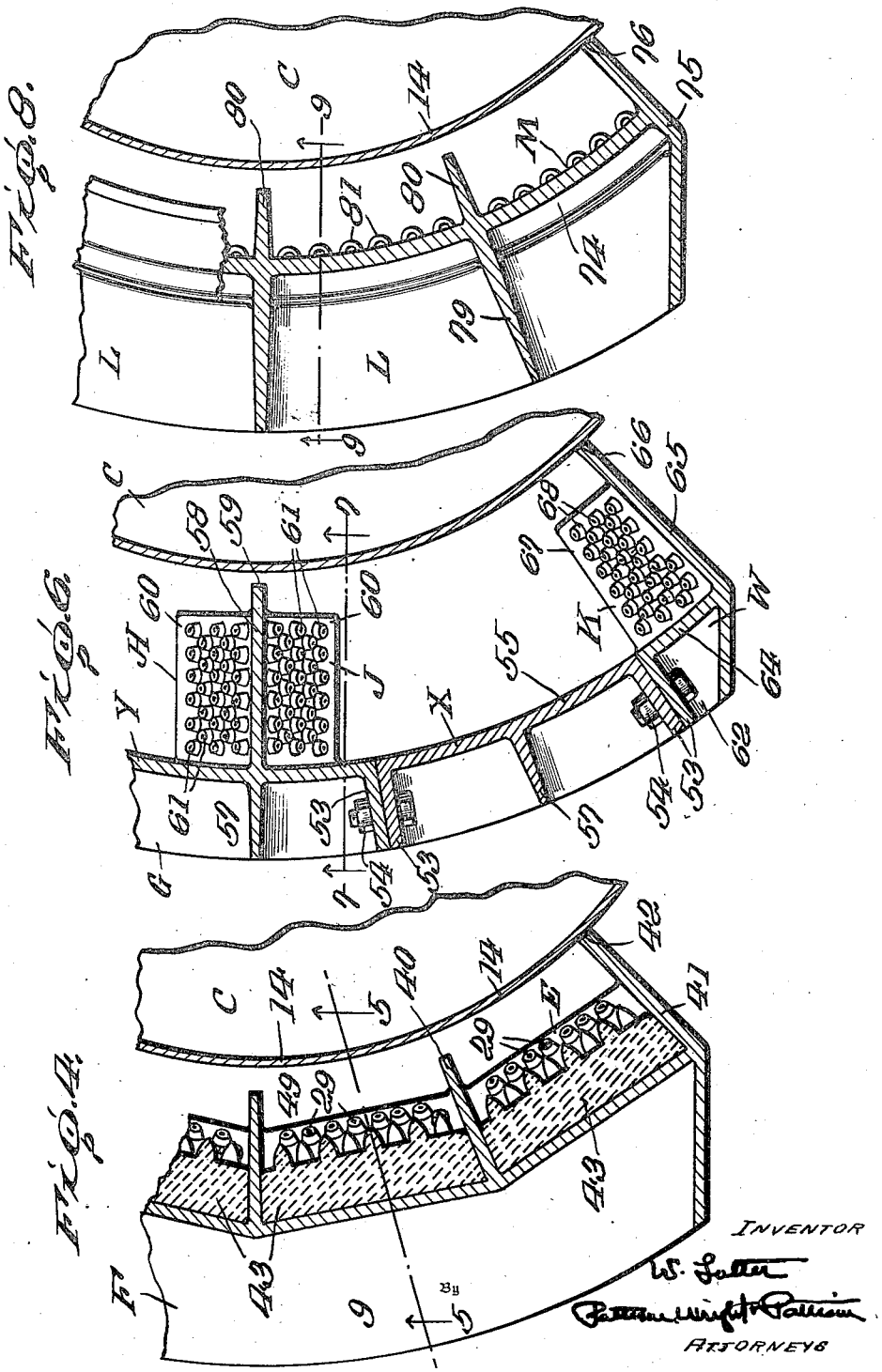

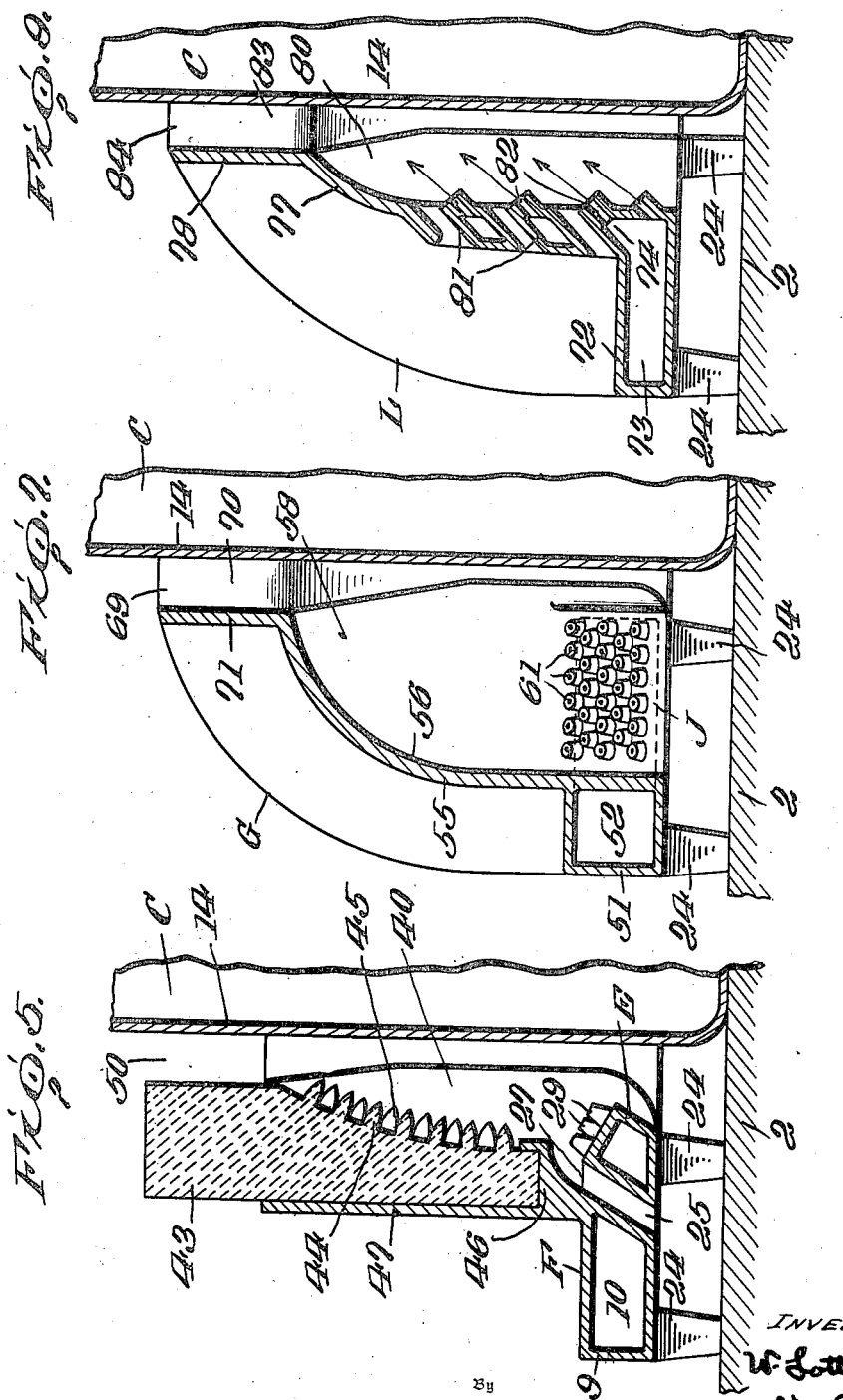

Patented Aug. 24, 1943

2,327,807

UNITED STATES PATENT OFFICE 2,327,807

BOOSTER BURNER

William Lotter, Cleveland, Ohio, assignor to American Stove Company, St. Louis, Mo., a corporation of New Jersey Application January 16, 1940, Serial No. 314,141

16 Claims. (Cl. 126—39)

The present invention pertains to booster burners the purpose and object of which is to provide in combination with a cooking range an additional heating or cooking medium for stepping or speeding up the boiling or other cooking operation performed in a cooking utensil positioned on the cooking top portion of the range above the cooking top burners thereof.

Another object of the present invention is that of providing a booster burner for directing heat against the side walls of a cooking utensil so as to apply heat thereto in addition to the heat applied in the usual and conventional manner to the bottom of the cooking utensil by the cooking top burners of a cooking range.

A still further object of the invention is to provide booster burners which are constructed in a novel manner which gives to them an improved and highly efficient operation as will more clearly and fully appear from the following description when read in the light of the accompanying drawings.

Other specific objects, novel features of construction and improved results will also appear from the following description and accompanying drawings which illustrate the specific embodiments which the invention may take in the accomplishment of the desired objects and improved results.

In the drawings:

Figure 1 is a vertical sectional view through the cooking top portion of a cooking range, in association with which is illustrated in side elevation one of the present improved booster burners.

Figure 2 is a top plan view of one of the booster burners illustrated in Figure 1 of the drawings, a portion of the cooking utensil being shown in horizontal section.

Figure 3 is a vertical sectional view taken on the line 3—3 of Figure 2 looking in the direction indicated by arrows.

Figure 4 is a fragmentary horizontal sectional view of a modified form of booster burner.

Figure 5 is a vertical sectional view taken on the line 5—5 of Figure 4 looking in the direction indicated by arrows.

Figure 6 is a fragmentary horizontal sectional view of a still further modified form of booster burner.

Figure 7 is a vertical sectional view taken on the line 7—7 of Figure 6 looking in the direction indicated by arrows.

Figure 8 is a fragmentary horizontal sectional view of a still further modified form of booster burner.

Figure 9 is a vertical sectional view taken on the line 9—9 of Figure 8 looking in the direction indicated by arrows.

The combination constituting the present invention is one which can be utilized in connection with any type of cooking range for accomplishing practically any type of cooking. In the drawings a gas range and a gas booster burner are illustrated, but obviously the burners could be operated upon other types of fuel. The drawings illustrate a range having a solid cooking top but it is to be understood that the present combination and booster burner could be utilized with a range of the so-called open cooking top type wherein there is a grid above the main range burner and upon which the cooking utensil is supported.

From the foregoing it will therefore be understood that the accompanying drawings are merely illustrative of constructions which can be utilized in the practice of the present invention but that departures from the constructions therein illustrated can be made without departing from the spirit of the invention and that the invention is to be limited only by the hereinafter appended claims.

Having reference to Figure 1 of the drawings, A designates the cooking top burner chamber of a cooking range which chamber in this instance has a closed or solid top made up of a top frame 1 upon which is removably supported above each of the cooking top burners B an outer ring 2, an inner ring 3, and a central plate 4. Fuel for the burner is delivered through a suitable and conventional manifold pipe 5 which has connection with the inlet end 6 of the burner gas manifold through a suitable valve 7 which is operable by a conveniently positioned valve handle 8.

A cooking utensil C is illustrated as being positioned on the cooking top of the range above a burner B in the position which is conventional for a cooking operation such for instance as boiling and one of the booster burners of the present invention, designated as an entirety by D, is illustrated in cooperative relationship with the utensil.

By reference particularly to Figures 2 and 3 of the drawings which illustrate in detail the booster burner D it will be seen that it comprises a semi-circular or arc shaped base which is a shallow closed box-like portion 9 located at the lower end of the whole structure and to provide a fuel manifold 10 to which fuel is delivered by a conduit 11 which is preferably flexible in nature for reasons which will hereinafter more fully appear, and which is connected to some suitable source of fuel supply. The inner wall or face 12 of the base is inwardly and upwardly inclined and merges into a further upwardly extending wall portion 13 which is curved so as to be concave in respect to the vertical adjacent side wall 14 of the cooking utensil. The wall extension portion at its upper end merges into a vertically disposed leg or wall portion 15 which is disposed parallel to and in separated relationship to the vertical side wall 14 of the utensil. At its ends the base portion has vertically extending end walls 16 and 17 which are complementary in height to the height of the inner face of wall of the burner made up of the wall portions 12, 13 and 15. To distinguish the wall 13 in the claims it will be called a vertical wall as it extends substantially at right angles to the end walls 16 and 17. These end walls have extending leg portions 16a and 17a which extend inwardly beyond the vertical leg portion 15 and when the burner is in operative relationship to the utensil the ends of these legs engage the outer face of the side wall 14 of the utensil so as to position the booster burner in spaced relationship to the side of the utensil and provide a space 18 which constitutes a vertical flueway or passage into which air can pass through its open bottom as indicated by the arrow 19 in Figure 3 of the drawings and from which products of combustion can freely pass through its open upper end as indicated by the arrows 20 in the same figure of the drawings.

In spaced relationship throughout its length the base is provided with upwardly extending strengthening webs 21, 22, and 23 which will prevent any possibility of the burner warping from heat. Additionally the burner is provided at suitable intervals and positions throughout its length with supporting legs 24 which rest upon the cooking top of the range and support the burner in spaced relation above said cooking top.

A plurality of these legs extend from the bottoms of the burners which are designated as an entirety at E. These burners are illustrated as being formed or cast as a part of the main base 9 and are connected thereto at spaced intervals by conduits 25 through which fuel passes from the main manifold 10 into the manifolds of the burners E.

A plurality of secondary air inlet openings 27 separate the branch conduits 25 and permit the upward and inward flow of secondary air, as indicated by arrows in Figure 3 of the drawings, between the rear walls 28 of the burners and the inner wall 12 of the base 9 and upwardly past the burner jets 29 which extend inwardly from the obliquely disposed top walls 30 of the burners.

By reference to Figure 2 of the drawings it will be seen that there are a plurality of independent burner units E which are separated from one another by substantially the entire widths of the connecting fuel conduits 25 and that they are further separated by vertically disposed and inwardly extending baffle plates 31 which extend upwardly from approximately the center of the tops of the connecting conduits 25. It is to be noted that the inner ends 32 of these baffles do not extend inwardly as far as do the ends 16a and 17a of the inner walls 16 and 17 with the result that they stop considerably short of having contact with the side wall 14 of the utensil. It is to be further noted that throughout a portion of their lengths the inner ends 32 of the baffles have a considerable portion of their length 33 disposed in a vertical plane in parallelism with the adjacent side wall 14 of the utensil while adjacent the top of the baffles their inner ends are inclined rearwardly and outwardly as at 34 so that the top ends of the baffle end at a point 35 which is at the top of the concave portion 13 of the casting. At their lower ends the baffles are shaped so that at the back of the burners E the baffles terminate as at 36 on a line with the rear top edge of the top walls 30 of the burners but at their inner lower corners extend downwardly and are curved inwardly and rearwardly as at 37 and terminate against the front wall 38 of the burners at a point considerably below the burner jets 29.

Each of the baffles 31 is provided with an opening 39 which is oppositely disposed in respect to the burner jets with the result that when one burner E is ignited the remaining burners will be ignited therefrom and for the further purpose of providing for a circulation through the baffles. In operation the heat and hot products of combustion generated by the series of burner units E are confined from lateral escapement by the end walls 16 and 17 of the device and as a consequence must travel upwardly between the several baffle plates 31 to finally escape through the narrow space or vertical flue 18 at the top of the device. The heat generated by the burners is reflected and radiated against the adjacent side wall 14 of the utensil by the concaved walls 13 of the device and any interference with operation of the individual burner units is prevented by the several heretofore referred to baffle plates 31. Secondary air for the burner is fed from below as clearly indicated in Figure 3 by arrows and the operation of the burners creates sufficient draft to entrain the necessary amount of secondary air to support proper combustion at the burner jets and to cause a constant movement of hot air and hot products of combustion against the adjacent side wall 14 of the utensil and up said side wall to escape as has been described. The booster burner will be highly efficient in that the heat generated by it is confined in its application to the adjacent side wall of the cooking utensil and is held in contact therewith for a sufficient period to cause the utensil and contents thereof to absorb the major portion of the heat of said hot products of combustion before they are allowed to escape to the surrounding atmosphere.

In Figure 1 of the drawings two booster burners are illustrated as being used in combination with the utensil and they are disposed at opposite sides thereof. Only one booster burner is illustrated in full lines for the purpose of conveying the idea that the use of more than one booster burner is optional in accordance with how great is the desire to add additional cooking heat to the utensil over that which is provided by the main range burner B.

As a matter of fact, and without departing from the spirit of the invention, the booster burner could be elongated until it constituted a ring which completely encircles the utensil. Additionally the booster burner need not be necessarily semi-circular or circular in configuration but could be made square or rectangular or in fact in any shape necessary to cooperate properly with the particular cross sectional configuration of the utensil with which it is to be used.

It is to be further noted that the booster burner is illustrated as being portable in that it is supported upon the legs 24 which permit it to be readily completely removed from the top of the range or to be slid on said top into any desired or required position. To facilitate this free movement of the burner the main fuel supply conduit 11 is made flexible as has been described. Obviously a gas cock will be provided in the fuel conduit 11 to control the supply of fuel to the booster burner for regulating the size of the flames burned thereat or to extinguish them completely when the additional heat supplied by the booster burner is not required or desired. It is to be recognized however that the booster burner or burners could be made so that they are immovably attached to the top of the cooking range, without departing from the spirit of the invention, but it is thought that the preferable and more desirable arrangement is that of making the booster burners portable and freely movable over the top of the range.

When both the booster and main range burners are in operation the speed of the cooking operation will be increased over that which would be obtained by the use of the main range burner only but by regulating the size of the flames at the booster burner the degree of increased speed of the cooking operation can be manually controlled to a nicety.

The booster burner fills a much needed want as it makes possible the speeding up of a cooking operation and the desirability of this will become immediately apparent to those familiar with cooking operations. When only the main range burner is present the cooking operation cannot be speeded up beyond the point where the greatest heat output of the range burner is reached. With the present booster burner the additional heat is applied to the sides of the utensil so that a greater heat absorption area of the utensil and the contents thereof is utilized for transmitting to the contents of the utensil the greatest possible amount of heat.

Booster burners having specific construction different from that immediately-before described can be provided and used with varying degrees of success and efficiency, and in Figures 4 to 9 inclusive I have illustrated other specific booster burner constructions which differ in construction and which suggest modifications of the invention without departing from the spirit thereof. It is to be recognized that even additional modified specific booster burner constructions could be conceived without departing from the spirit of the invention and that the modifications illustrated and about to be described are not to be considered as limiting the hereinafter appended claims beyond a fair scope of the invention as defined by them.

In Figures 4 and 5 of the drawings a modified form of booster burner is illustrated which is very similar in construction to the preferred form heretofore described in that the main difference resides in the use of radiants. Parts which are similar in construction to those previously described are designated with the same reference numerals and letters heretofore used. In this instance the booster burner as an entirety is designated by F and comprises the same base 9 providing the main fuel manifold 10 from which fuel is delivered to the several burner elements E by the several connecting fuel conduits 25. There are the same secondary air inlet openings 27 positioned intermediate the burner elements and there is likewise provided vertically and inwardly extending baffle plates 40 the inner edges of which terminate short of the adjacent side wall of the utensil. As in the preferred form of the invention the ends walls 41 of the unit or casting constituting the booster burner have their inner ends 42 in engagement with the side wall of the utensil.

A radiant 43 is positioned behind and above each of the burner units E and a portion of its face which is opposed to the utensil is formed concave as at 44 and provided with outwardly extending cone shaped elements 45. This radiant element is supported as indicated at 46 on a shoulder formed as a part of the bottom of the vertical wall 47 of the unit which wall can and preferably stops short of the top end of the radiant element. A strengthening rib, similar to the hereinbefore referred to rib 22, may be provided for the wall 47. The inner face of the radiant element throughout its entire height is in separated relationship to the adjacent side wall of the utensil with the result that the hot products of combustion travel upwardly through the vertical passageway or flue 49 and escape through the open upper end 50 thereof.

The booster burner described has the advantage of utilizing the efficiency which is obtained through the use of radiant heat elements.

Referring to Figures 6 and 7, the booster burner as an entirety is designated at G and for the purpose of making it variable as to length it is made up in a plurality of segments X and Y. Each of these segments has a base 51 which is hollow to provide a main fuel conduit 52. Each segment at its end has upwardly and inwardly extending flanges or end walls 53 which are suitably secured in abutting relationship by bolts 54 or the like with their hollow conduit base portions arranged in registering relationship. The vertical end walls 53 are joined by a vertically extending wall 55 which is curved to present a convex surface 56 which is in opposed relationship to the side wall of the utensil. Each of the segments is provided with a strengthening web 57 and preferably each section is formed or cast as a unit.

In Figure 6 and 7 of the drawings it is intended that two units X and one unit Y be utilized. The unit Y is positioned intermediate the two units X and differs therefrom by having an inwardly and vertically extending baffle plate 58 the inner end 59 of which stops short of the side wall 14 of the utensil. This baffle at opposite sides on its lower end carries the burner elements H and J which are of identical construction. Each burner has an inclined top face or wall 60 in which are disposed the plurality of burner jets 61. It is to be understood of course that fuel for the burner elements is delivered to the jets 61 thereof from the main fuel manifold 52.

At each of its ends the unit is provided with a segment W which has a main horizontally disposed base and conduit 62 above which there is a vertically extending flange 53 which abuts a similar flange 53 of an adjacent section X to which it is secured by bolts 54 or the like. This segment W has a vertical face wall 64 which is in alignment with the wall 55 of the adjacent segment X and has an inwardly and upwardly extending wall 65 the inner end 66 of which abuts the wall of the utensil. At its inner side adjacent its lower end the wall 65 is provided with a burner element K having on its upper inclined face or top 67 a plurality of burner jets 68.

The booster burner G, like the hereinbefore described burners, is supported in elevated relation above the top of the range by legs 24 with the result that secondary air can readily flow upwardly past the burner jets and the hot products of combustion generated by the burner elements can flow upwardly along and against the side wall of the utensil and escape through the open upper end 69 of the flueway 70.

In connection with the booster burner illustrated in Figures 6 and 7 of the drawings it is to be recognized that the number of burner elements can be increased or reduced in accord with the amount of additional heat it is desired to apply to the utensil. In explanation of the above it is pointed out that only the burners H and J might be provided and that the burner elements K carried by the end walls 65 of the end segments W might be eliminated. The reduction of burners might however be accomplished by the elimination from the baffle 58 of the burner elements H and J and utilizing only the burner elements K carried by the end walls 65 of the end segments W.

The modified form of booster burner illustrated in Figures 8 and 9 is designated as an entirety at L and comprises a base 72 which is hollow to form a fuel conduit having a horizontally disposed portion 73 and a vertically extending portion 74 which is opposed to the adjacent side wall 14 of the utensil C. The booster burner is supported above the top of the range by the short legs 24 and has end walls 75 the inner ends 76 of which abut the side of the utensil. The vertical conduit between the end wall 76 at its upper end has a concaved portion 77 terminating in a verticaly disposed portion 78 arranged in spaced parallel relationship to the side wall of the utensil. The vertical conduit is divided into a plurality of chambers by vertically extending baffles 80 the ends of which stop short of the side wall of the utensil. The vertical conduits intermediate the baffles each constitute a burner element designated as an entirety by M and each made up of a plurality of burner jets 81 the burner orifices 82 of which are drilled at a forwardly extending angle so as to direct the flames upwardly towards the utensil side wall as indicated by arrows in Figure 9. The concave portion 77 of the booster burner wall above the burner elements tends to direct the heat and hot products of combustion towards the side of the utensil and into the passage or flue-like conduit 83 to cause the hot products of combustion to travel through this restricted passageway prior to escape into the atmosphere through the upper open end 84 thereof.

It will be obvious that the mode of operation of this particular embodiment of the invention is similar to that hereinbefore described in respect to the other specific forms of booster burners.

The main range burner B could be made of one or more burner arms to which a supply of fuel could be independently controlled so as to give a closer control of the heat delivered to the bottom of the utensil. Obviously the solid cooking top plate 4 and the solid ring 2 and 3 could be dispensed with to make of the range a so-called open cooking top. The number of these elements removed would depend on the size of the cooking utensil and if desired a grid could be substituted for them.

The invention is not to be limited by the precise constructions illustrated and described but only to be limited within the legal scope of the following claims.

I claim:

1. A heating device for application to the outer face of a side wall of a cooking utensil comprising, a base, a fuel supply manifold carried by said base, a face plate and a pair of end walls extending upwardly from said base to form three sides of a chamber having open upper and lower ends, said end walls being adapted to engage said cooking utensil side wall to close the open side of said chamber, a gaseous fuel burner supported by and positioned at the side of said base and in the lower end of said chamber, said burner being in the form of a plurality of separated burner units each of which has a plurality of burner orifices, and vertically disposed baffles intermediate the ends of adjacent burner units, said baffles being connected to said face plate and extending toward the side wall of said utensil.

2. A construction as defined in claim 1 wherein the face plate has a portion which is curved upwardly and inwardly toward the open side of the chamber but stops short thereof and terminates in an upper end portion which is disposed in a vertical plane and in separated relationship to the side wall of the utensil to provide at the upper end of the chamber a restricted outlet passageway.

3. A construction as defined in claim 1 wherein the burner is positioned in the lower end of said chamber and is positioned at one side of said base, said base behind said burner being provided with a secondary air inlet communicating with said chamber at a point behind the burner orifices of said burner to provide secondary air in addition to that which can enter the lower open end of said chamber in front of said burner, and the face plate has a portion which is curved upwardly and inwardly toward the open side of the chamber but stops short thereof to provide at the upper end of the chamber a restricted outlet passageway.

4. A heating device for application to the outer face of a side wall of a cooking utensil comprising, a base, a fuel supply manifold carried by said base, a face plate and a pair of end walls extending upwardly from said base to form three sides of a chamber having an open side and an open upper end and a secondary air inlet at its lower end, said end walls adapted to engage said cooking utensil side wall to close the open side of said chamber, a plurality of gaseous fuel burners supported by said base and positioned in the lower end of said chamber and connected to said fuel supply manifold, said burners comprising a plurality of spaced units along the length of said base and each having a plurality of burner orifices, a vertically disposed baffle plate in each space between adjacent burner units and extending horizontally in a direction toward the side wall of said utensil, a vertically elongated radiant element positioned behind each burner unit and having a concave shaped portion in one of its vertical walls above and overhanging the burner unit, and said radiant elements having an upper end portion having a side wall in spaced relationship to the side wall of said utensil to reduce the size of the opening at the upper end of said chamber.

5. A construction as defined in claim 4 wherein, said base is provided with a secondary air inlet conduit behind each of said burner units, and said conduits having their discharge ends communicating with said chamber at a point behind the burner orifices of the burner unit with which it is associated.

6. A heating device for application to the outer face of a side wall of a cooking utensil comprising, an elongated base, a fuel supply manifold carried by said base, a face plate and a pair of end walls extending upwardly from said base to form three sides of a chamber having an open side and an open upper end and a secondary air inlet at its lower end, said end walls adapted to engage said cooking utensil side wall to close the open side of said chamber, a plurality of spaced vertically disposed baffle plates in said chamber and extending from said face plate toward the open side of said chamber, a plurality of gaseous fuel burners connected to said fuel supply manifold, one of said burners being supported on each of the side walls of each of said baffle plates adjacent the lower ends of said plates, and one of said burners being positioned on the lower end of each of said chamber end walls and within said chamber.

7. A construction as defined in claim 6 wherein, the face plate has a curved portion intermediate its length which overhangs all of said burners and acts to reflect and direct the hot products of combustion generated by said burners toward the side wall of said utensil, and the upper end of said face plate being disposed in separated relationship to the side wall of said utensil to restrict the size of the opening at the upper end of said chamber.

8. A heating device for application to the outer face of a side wall of a cooking utensil comprising, an elongated base, a fuel supply manifold carried by said base, a face plate and a pair of end walls extending upwardly from said base to form three sides of a chamber having an open side and an open upper end and a secondary air inlet at its lower end, said end walls adapted to engage said cooking utensil side wall to close the open side of said chamber, a plurality of gaseous fuel burner units connected to said fuel supply manifold, each of said units comprising a plurality of burner orifices extending through said face plate to direct flames into said chamber, and a plurality of secondary air inlet conduits extending through said face plate at a plurality of points closely adjacent said burner orifices and having their discharge ends in communication with said chamber.

9. A construction as defined in claim 8 wherein, said burner units are in spaced relation lengthwise of said face plate, a plurality of vertical baffle plates are disposed in said chamber, and one each of said plates is positioned in the spaces between adjacent burner units and extends in a direction across said burner chamber toward the open side of said chamber and the side wall of said utensil.

10. A construction as defined in claim 8 wherein, said face plate has an upper end portion positioned in closer proximity to the side wall of said utensil than is the remaining portion of said face plate to restrict the size of the open upper end of said chamber.

11. A heating device for application to the outer face of a side wall of a cooking utensil comprising, an elongated base, a fuel supply manifold carried by said base, a face plate and a pair of end walls extending upwardly from said base to form three sides of a chamber having an open side and an open upper end and a secondary air inlet at its lower end, said end walls being adapted to engage said cooking utensil side wall to close the open side of said chamber, a plurality of gaseous fuel burner units connected to said fuel supply manifold, each of said units comprising a plurality of burner orifices extending through said face plate to direct flames into said chamber, a plurality of secondary air inlet conduits extending through said face plate at a plurality of points closely adjacent said burner orifices and having their discharge ends in communication with said chamber, said burner units being spaced lengthwise of said face plate, a plurality of vertically disposed baffle plates in said chamber, one each of said plates being positioned in each space between said burner units and extending in a direction toward the open side of said chamber and the side wall of said utensil, and said face plate having the upper end positioned closer to the side wall of said utensil than is the remaining portion of said face plate to restrict the open upper end of said chamber.

12. A heating device for application to the outer face of a side wall of a cooking utensil comprising, a base, a fuel supply manifold carried by said base, a face plate and a pair of end walls extending upwardly from said base to form three sides of a chamber having an open side and an open upper end, said end walls being adapted to engage a side wall of said container to close the open side of said chamber, a gaseous fuel burner carried by said base and connected to said fuel supply manifold, said burner being positioned in said chamber adjacent the lower end thereof, and said chamber provided with air inlets for providing secondary air for said burner.

13. A heating device for application to the outer face of a side wall of a cooking utensil comprising, a base, a fuel supply manifold carried by said base, a face plate and a pair of end walls extending upwardly from said base to form three sides of a chamber having an open side and open upper and lower ends, said end walls adapted to engage said cooking utensil side wall to close the open side of said chamber, a gaseous fuel burner connected to said fuel supply manifold and positioned in the lower end of said chamber and supported on said base at one side thereof, said base behind said burner being provided with a secondary air inlet communicating with said chamber at a point behind the burner orifices of said burner to provide secondary air in addition to that which can enter the lower open end of said chamber in front of said burner, and the flames and hot products of combustion of said burner discharging into said chamber and traversing the same to escape through the upper open end thereof.

14. A heating device for application to the outer face of a side wall of a cooking utensil comprising, a base, a fuel supply manifold carried by said base, a face plate and a pair of end walls extending upwardly from said base to form three sides of a chamber having an open side and open upper and lower ends, said end walls adapted to engage said cooking utensil side wall to close the open side of said chamber, a gaseous fuel burner connected to said fuel supply manifold and positioned in the lower end of said chamber and supported on said base at one side thereof, said base behind said burner being provided with a secondary air inlet communicating with said chamber at a point behind the burner orifices of said burner to provide secondary air in addition to that which can enter the lower open end of said chamber in front of said burner, said face plate having a portion which is curved upwardly and inwardly to provide at the upper end of the chamber a restricted outlet passageway, and the flames and hot products of combustion of said burner discharging into said chamber and traversing the same to escape through said restricted outlet passageway.

15. A heating device for application to the outer face of a side wall of a cooking utensil comprising, a base, a fuel supply manifold carried by said base, a face plate and a pair of end walls extending upwardly from said base to form three sides of a chamber having an open side and an open upper end, said end walls adapted to engage said cooking utensil side wall to close the open side of said chamber, a gaseous fuel burner carried by said base and connected to said fuel supply manifold, said face plate being provided with a portion which is curved upwardly and inwardly toward the open side of the chamber but has its upper end stopping short thereof to provide at the upper end of the chamber adjacent the side wall of the container a restricted outlet passageway, and the flames and hot products of combustion of said burner discharging into said chamber and traversing the same to escape through said restricted outlet passageway at the upper end thereof.

16. A construction as defined in claim 15 wherein, the upwardly and inwardly curved portion of the face plate terminates in an upper end portion which is disposed in a vertical plane and in separated relationship to the side wall of the utensil.

WILLIAM LOTTER.